United States Patent
Garcia et al.

(10) Patent No.: US 10,341,506 B2
(45) Date of Patent: *Jul. 2, 2019

(54) CALIBRATED PRINT DATA GENERATION BASED ON COLOR CALIBRATION DATA ACCOUNTING FOR BACKLIGHT CHARACTERISTICS

(71) Applicant: Hewlett-Packard Development Company, L.P., Houston, TX (US)

(72) Inventors: Luis Garcia Garcia, Les Roquetes (ES); Sergio Puigardeu Aramendia, Barcelona (ES); M. Isabel Borrell Bayona, Barcelona (ES); Angel Martinez Barambio, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,696

(22) Filed: Apr. 10, 2018

(65) Prior Publication Data

US 2018/0234558 A1    Aug. 16, 2018

Related U.S. Application Data

(63) Continuation of application No. 14/989,512, filed on Jan. 6, 2016, now Pat. No. 9,967,406, which is a continuation of application No. 14/396,618, filed as application No. PCT/EP2012/057481 on Apr. 12, 2012, now Pat. No. 9,264,583.

(51) Int. Cl.
*H04N 1/46* (2006.01)
*H04N 1/00* (2006.01)
*H04N 1/60* (2006.01)
*G06K 15/10* (2006.01)

(52) U.S. Cl.
CPC ....... *H04N 1/00087* (2013.01); *G06K 15/102* (2013.01); *H04N 1/00023* (2013.01); *H04N 1/00034* (2013.01); *H04N 1/6044* (2013.01)

(58) Field of Classification Search
None
See application file for complete search history.

(56) References Cited

U.S. PATENT DOCUMENTS

| | | | |
|---|---|---|---|
| 4,070,779 A | 1/1978 | Gilmour | |
| 4,707,747 A | 11/1987 | Rockwell, III | |
| 4,873,546 A | 10/1989 | Zahn et al. | |
| 4,876,546 A | 10/1989 | Koerner | |
| 5,822,052 A | 10/1998 | Tsai | |
| 6,108,461 A | 8/2000 | Haga | |
| 6,431,679 B1 | 8/2002 | Li et al. | |
| 6,606,171 B1 | 8/2003 | Renk et al. | |

(Continued)

FOREIGN PATENT DOCUMENTS

EP     1215887      6/2002
WO     2012040424   3/2012

*Primary Examiner* — Dung D Tran
(74) *Attorney, Agent, or Firm* — HP Inc. Patent Department

(57) ABSTRACT

According to one example, there is provided a printing system. The printing system comprises a support having a plurality of spaced apertures and a colour sensor moveable to measure light from each aperture. The printing system further comprises a controller to control the colour sensor to measure characteristics of light emitted through each aperture, and to determine, for each aperture, light calibration data.

20 Claims, 4 Drawing Sheets

(56) References Cited

U.S. PATENT DOCUMENTS

| | | | |
|---|---|---|---|
| 7,006,246 | B1 | 2/2006 | Nakajima |
| 7,224,484 | B1 | 5/2007 | Reeves et al. |
| 7,656,554 | B2 | 2/2010 | Deer et al. |
| 7,895,783 | B1 | 3/2011 | Spejo |
| 8,471,807 | B2 | 6/2013 | Seetzen et al. |
| 8,472,174 | B2 | 6/2013 | Idems et al. |
| 8,587,849 | B2 | 11/2013 | Gupta et al. |
| 8,786,199 | B2 | 7/2014 | Yoshida et al. |
| 2002/0054292 | A1 | 5/2002 | Orelli et al. |
| 2003/0116694 | A1 | 6/2003 | Maeda |
| 2003/0123108 | A1 | 7/2003 | Lin et al. |
| 2006/0098096 | A1 | 5/2006 | Gupta et al. |
| 2006/0245013 | A1 | 11/2006 | Ikeno et al. |
| 2007/0064287 | A1 | 3/2007 | Mai et al. |
| 2010/0066999 | A1 | 3/2010 | Tatarczyk et al. |
| 2013/0176603 | A1 | 7/2013 | Bernstein |
| 2013/0222461 | A1 | 8/2013 | Kaszynski |

CALIBRATED PRINT DATA GENERATION BASED ON COLOR CALIBRATION DATA ACCOUNTING FOR BACKLIGHT CHARACTERISTICS

BACKGROUND

Increasing use is being made of printed items that are intended to be viewed in conjunction with backlighting. Such printed items include advertising signage, banners, and posters, etc. that are designed to be viewable at night or in low-lighting areas.

To ensure that images printed on substrates that are intended to be viewed when backlit (hereinafter referred to as backlit substrates) are rendered accurately printers used to print on backlit substrates need to be correctly calibrated.

BRIEF DESCRIPTION

Examples, or embodiments, of the invention will now be described, by way of non-limiting example only, with reference to the accompanying drawings, in which.

DETAILED DESCRIPTION

Figure 1:
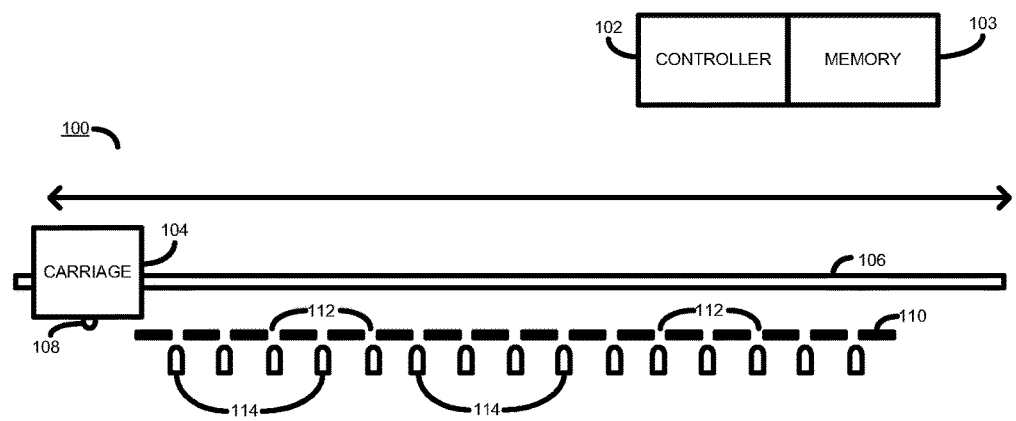
FIG. 1 is a simplified section view of a portion of a printing system according to one example.
Figure 2:
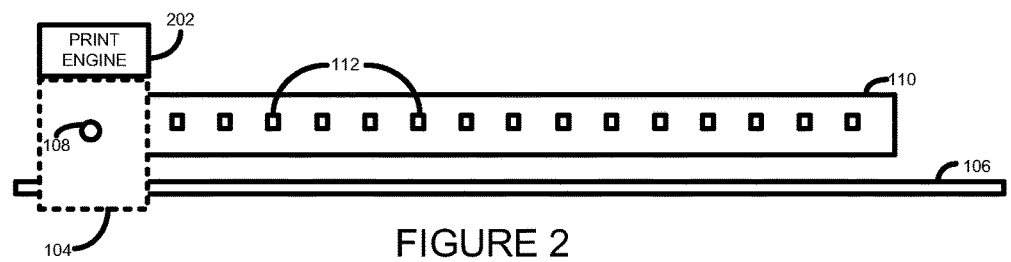
FIG. 2 is a simplified plan view of a portion of a printing system according to one example.

Referring now to FIG. 1, there shown a simplified section view of a portion of a printing system 100 according to one example. FIG. 2 shows a simplified plan view of a corresponding portion of the printing system 100. For clarity it will be appreciated that in the accompanying drawings not all elements of a printing system 100 are shown.

The printing system 100 is controlled by a printer controller 102 in accordance with computer or controller readable instructions stored in a memory 103. The controller 102 is coupled to the memory 103 by a suitable communication bus (not shown). In one example the printer controller 102 may be a microprocessor. Execution of the computer readable instructions by the controller 102 operates elements of the printing system 100 in accordance with a method or methods described herein.

The printing system 100 comprises a carriage 104 that is moveable along a carriage bar 106. The carriage 104 may be moveable, for example, through use of a motor, belt, or other suitable means.

On the carriage 104 is mounted a colour sensor or colour sensing device 108, such as a spectrophotometer, colorimeter, or the like. In one example the carriage 104 additionally comprise a print engine 202. The print engine 202 may comprise one or multiple printheads, such as inkjet printheads, controllable to eject ink drops onto a substrate installed in the printing system 100. In another example the print engine 202 is provided on a separate carriage (not shown) distant from the carriage 104. In a further example the print engine may be an inkjet page-wide array print engine operable to print on the whole width of a substrate without scanning across the substrate. In a further example the print engine may be a dry ink or liquid ink toner print engine.

The colour sensing device 108 measures characteristics of light received thereat. For example, measured characteristics may include: the wavelength or wavelengths of received light; and the intensity of received light. If a spectrophotometer is used as the colour sensing device 108, for example, it may measure the different wavelengths of received light and calculate CIE Lab or XYZ values.

The colour sensing device 108 is mounted on the carriage 108 such that it sits above a substrate support or platen 110. In one example the distance of between the colour sensing device 108 and the platen 110 is in the range of about 1 to 3 mm. In other examples other distances may be used.

The printer platen 110 comprises a number of apertures 112 at a number of predetermined locations therein. In the present example the apertures 112 are arranged in a linear manner and are substantially equally spaced. However, in other examples other arrangements or spacings of apertures may be used.

In one example each aperture is covered with a cover (not shown). In one example a transparent cover may be used, such as glass. In another example each aperture is covered with a light diffuser.

The colour sensing device 108 and apertures 112 are arranged relative to one another such that the colour sensing device 108 on the carriage 104 may be selectively positioned vertically above each one of the apertures 112 and may measure characteristics of light emitted through each aperture. In one example the colour sensing device 108 and the platen 110 are shielded from external light sources such that the colour sensing device 108 does not measure characteristics any external light sources. In one example, the colour sensing device 108 may be used to measure characteristics of light emitted from less than the total number of apertures 112.

In one example the apertures 112 may be spaced apart in the range of about 2 to 5 cm, although in other examples different aperture spacings may be used. In one example 16 apertures are provided in the platen 110, although in other examples a greater or smaller number of apertures may be provided.

In one example, as shown in FIG. 1, below each of the apertures 112 is positioned an individual light source 114. In one example each individual light source 114 is a light emitting diode (LED). In one example each of the LEDs 114 are so-called white LEDs that emit light in about the 400-700 nm wavelength range. In other examples other individual light sources may be used. In one example each of the individual light sources 114 are optically shielded from each other such that through each aperture 112 light is only emitted from a single one of the light sources 114.

Figure 3:
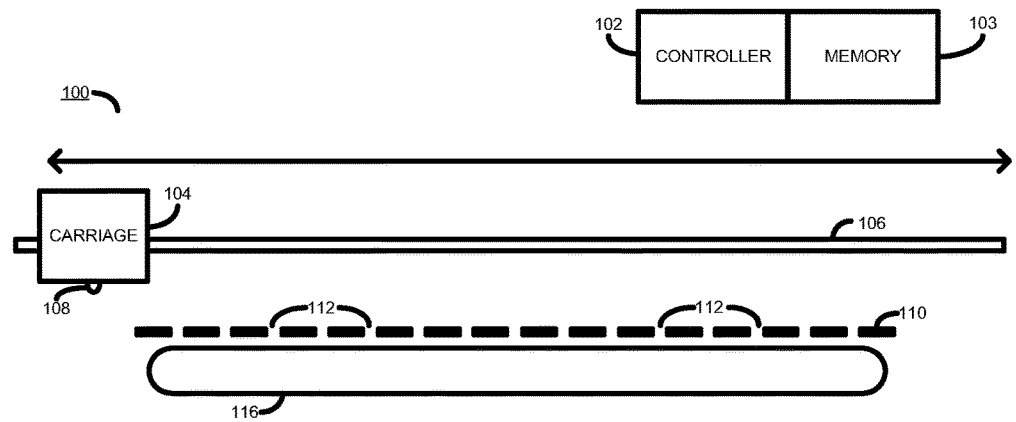
FIG. 3 is a simplified section view of a portion of a printing system according to one example.

In a further example, as shown in FIG. 3, below the apertures 112 is positioned a single light source 116. In one example the single light source 116 is a tube lamp, such as a white fluorescent lighting tube.

In a yet further example, one light source may be positioned below a group of apertures 112, such that multiple light sources are used to emit light through the total number of apertures 112 in the platen 110.

Apertures may be chosen to be any suitable shape, such as circular or rectangular. In one example the width of each aperture is in the range of about 5 to 10 mm, although in other examples other apertures sizes may be used.

Figure 4:
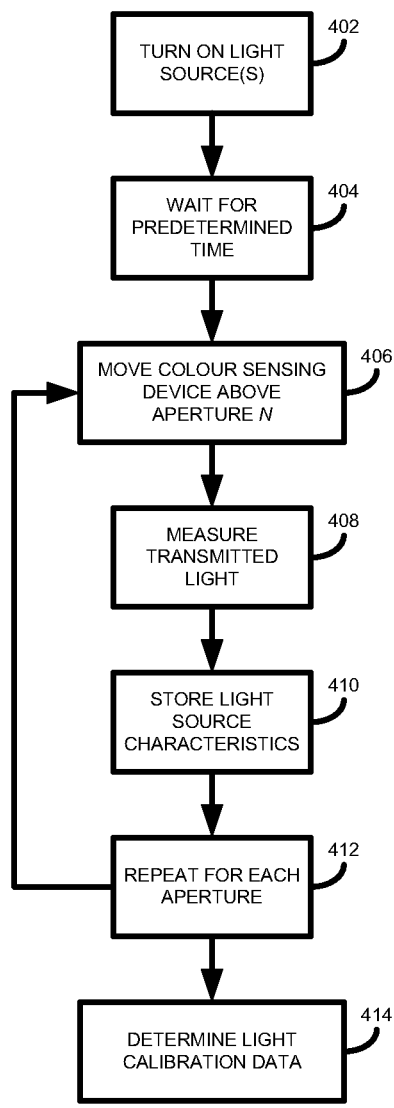
FIG. 4 is a flow diagram outlining an example method according to one example.

Before using the printing system 100 of the present examples to print on a backlit substrate the controller 102 controls elements of the printing system 100 to perform a calibration step, as described below in further detail with additional reference to the flow diagram of FIG. 4.

At block 402 the controller 102 turns on each of the light sources 114 or light source 116 below the platen 110. At block 404 the controller 102 waits for a predetermined time period to allow the light source(s) to stabilise. This period enables the light source(s) to suitably warm up and helps ensure that the light output has substantially constant characteristics.

In one example the predetermined time period is between about 1 minute and 5 minutes depending on the type of light source(s) used. In other example a shorter or longer time period may be chosen based on the characteristics of the chosen type of light source.

At block 406 the controller 102 controls the carriage 104 on which is mounted the colour sensing device 108 to position the colour sensing device 108 vertically above a first aperture 112 in the printer platen 110.

Once the colour sensing device 108 is suitably positioned, at block 408 the controller 102 uses the colour sensing device 108 to measure characteristics of the light emitted through the first aperture 112. At block 410 the measured light characteristics are stored in a memory 103.

At block 412 the controller 102 controls the carriage 104 to position (block 406) the colour sensing device 108 vertically above a second aperture 112 in the printer platen 110, and blocks 408 and 410 are repeated until characteristics of light emitted through each of the apertures 112 have been made and the characteristics stored in the memory 103.

Once characteristics for light emitted through each of the apertures 112 have been measured by the colour sensing device 108 and stored in the memory 103 at block 414 the processor 102 determines, or calculates, light calibration data for light emitted through each of the apertures 112.

The light calibration data determined for light emitted through each of the apertures 112 enables light emitted through each of the apertures to be normalised. In one example the light calibration data may be determined by comparing the measured characteristics of light emitted through an aperture with a set of predetermined light characteristics. The controller 102 may then determine one or multiple coefficients that when applied to measured characteristics of light emitted through an aperture generate a 'normalised white light' having predetermined light characteristics. The determined light calibration data enables uniform light measurements to be made across each of the apertures, even though the characteristics of light emitted through different apertures may vary.

Advantageously, determining individual calibration data for each aperture 112 enables a low-cost light source 116 or light sources 116 to be used. For example, a low-cost fluorescent tube 116 may be used that does not exhibit constant light characteristics along the length of the tube 116. Similarly, low-cost LED lamps may be used, even though the characteristics of light emitted by each lamp may be different.

Once light calibration data has been determined for light emitted through each of the apertures 112 the processor 102 may perform a further calibration process to determine printing system colour calibration data, as will now be described with further reference to FIGS. 5 and 6.

Figure 5:
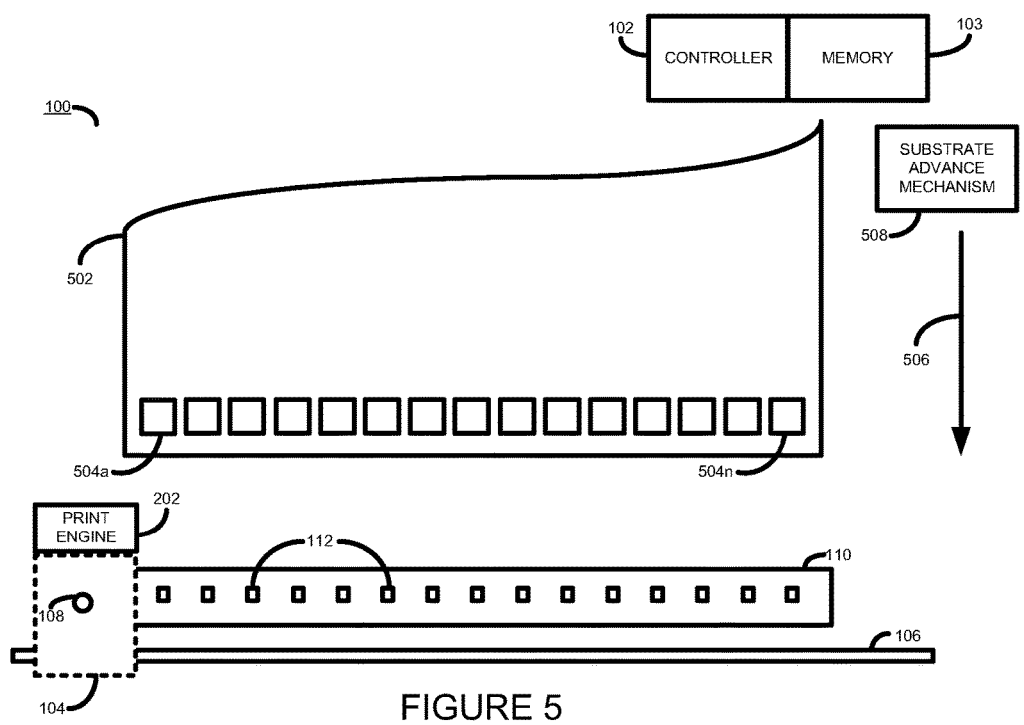
FIG. 5 is a simplified top view of a portion of a printing system according to one example.
Figure 6:
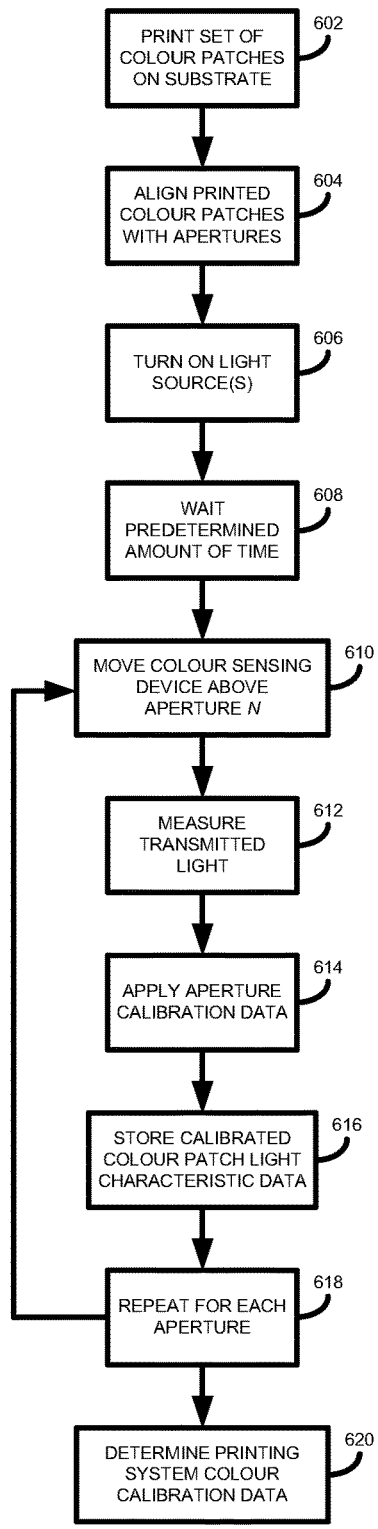
FIG. 6 is a flow diagram outlining an example method according to one example.

FIG. 5 shows a simplified plan view of the printing system 100 in which a sheet of backlit substrate 502 is inserted.

At block 602 (FIG. 6) the controller 102 controls the printing system 100 to print a set of colour patches 504a to 504n on the substrate 502.

In one example one or multiple rows of colour patches may be printed. For example, a first row may comprise a set of single colour colour patches printed at a range of colour densities. For example, a leftmost colour patch may be printed using a first single colour ink and have a colour density of 100%, and a rightmost colour patch may be printed using the first single colour ink and have a colour density of 5%. The patches in-between may have graduated ink densities, for example depending on the number of apertures 112 in the platen In one example, in a printing system capable of printing with N different single colour inks N rows of graduated colour patches may be printed, with each row being printed using a different one of the N colour inks.

The substrate 502 is advanced through the printing system 100 in a substrate advance direction 506. The substrate 502 is advanced using a substrate advance mechanism 508 that may include, in some examples, a powered roller, a belt, or the like. In some examples the substrate 502 may be moved both forwards and backwards in the substrate advance direction.

In one example the colour patches 504 may be printed by the print engine 202 located on the carriage 104 using one or multiple inkjet printheads. In another example the print engine 202 may located distant from the carriage 104. Each colour patch is printed such that when the substrate is suitably positioned over the platen 110 each colour patch 504 is positioned vertically above one of the apertures 112.

At block 604 the printer controller 102 controls the substrate advance mechanism 508 to move the substrate 502 in the substrate advance direction 506 to align each of the printer colour patches 504 with a corresponding platen aperture 112. In one example, the printer controller 102 may wait for a predetermined length of time before positioning the substrate 502 to allow the ink used to print the colour patches 504 to dry or cure.

At block 606 the printer controller 102 controls the light source 116 or light sources 114 to switch on. At block 608 the printer controller 102 waits a predetermined length of time to allow the light source 116 or light sources 114 to stabilise or warm up.

At block 610 the printer controller 102 controls the carriage 104 on which is mounted the colour sensing device 108 to position the colour sensing device 108 vertically above a first aperture 112 in the printer platen 110.

Once the colour sensing device 108 is suitably positioned, at block 612 the controller 102 measures, using the colour sensing device 108, characteristics of the light emitted through the first aperture 112 and through the colour patch 504 positioned above the aperture 112. At block 614 the printer controller 102 obtains the previously determined light calibration data for the current aperture from the memory 103 and applies the calibration data to the measured light characteristics to determine calibrated colour patch light characteristics.

At block 616 calibrated colour patch light characteristic data is stored in the memory 103.

At block 618 the controller 102 controls the carriage 104 to position (block 610) the colour sensing device 108 vertically above a second aperture 112 in the printer platen 110, and blocks 612, 614, and 616 are repeated until characteristics of light emitted through each of the apertures 112 and through the colour patch 504 positioned above each aperture have been made and the light characteristics stored in the memory 103.

In examples where multiple rows of colour patches are printed on the substrate 502 the controller 102 may advance the substrate 502 such that a further row of colour patches are positioned above the apertures, enabling colour measurements to be taken for each of the rows of colour patches.

Once calibrated colour patch light characteristics for light emitted through each of the apertures 112 and through the colour patches 504 have been measured by the colour sensing device 108 and stored in the memory 103 at block 620 the processor 102 determines, or calculates, colour calibration data for the printing system 100.

In one example the colour calibration data is determined by comparing the stored calibrated colour patch light characteristics for each colour patch with known characteristics of each printed colour patch, such as the ink colour used and colour density printed. In this way, if it is determined that calibrated colour patch light characteristics of a particular printed colour patch do not correspond to known characteristics of the colour patch adjustments within the printing system 100 may be made. In one example the determined colour calibration data may be used to feed a closed-loop colour calibration system.

One advantage of examples described herein is that by integrating the platen 110, apertures 112, and light source(s) within a printing system enables the printing system 100 to perform printing system colour calibration for use with backlit substrates in a substantially automated manner. This avoids having to resort to use of separate colour calibration systems.

A further advantage of the present examples is that the cost of adding one or multiple light sources below a printer platen having a series of apertures is low.

It will be appreciated that examples and embodiments of the present invention can be realized in the form of hardware, software or a combination of hardware and software. As described above, any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples of the present invention. Examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A printing system comprising:
a calibration mechanism to:
receive print data of an image that is to be backlight when the image is displayed;
receive color calibration data that accounts for characteristics of a backlight; and
generate calibrated print data from the print data of the image, based on the color calibration data; and
a printing engine to print the image on a substrate by printing the calibrated print data.

2. The printing system of claim 1, further comprising:
the backlight to backlight the image as printed on the substrate for display.

3. The printing system of claim 2, wherein the backlight comprises a plurality of individual light sources.

4. The printing system of claim 2, wherein the backlight comprises a single light source.

5. The printing system of claim 1, wherein the calibration mechanism is further to:
emit light from the backlight through a plurality of apertures;
measure the characteristics of the light emitted through each aperture;
determine light calibration data for each aperture; and
determine the color calibration data based on the determined light calibration data.

6. The printing system of claim 5, wherein the calibration mechanism is to measure the characteristics of the light emitted through each aperture by controlling a movable color sensor to measure the characteristics of the light emitted through each aperture.

7. The printing system of claim 5, wherein the calibration mechanism is further to generate the color calibration data, by:
printing a plurality of color patches aligned with the apertures;
measuring the characteristics of the light emitted through the apertures and through the color patches;
applying the determined light calibration data for the apertures to the measured characteristics of the light emitted through the apertures and through the color patches, to determine calibrated color patch light characteristic data; and
determine the color calibration data, based on the determined calibrated color patch light characteristic data.

8. A method comprising:
receiving print data of an image that is to be backlight when the image is displayed;
receiving color calibration data that accounts for characteristics of a backlight; and
generating calibrated print data from the print data of the image, based on the color calibration data; and
causing a printing engine to print the image on a substrate by printing the calibrated print data.

9. The method of claim 8, further comprising:
backlighting, using the backlight, the image as printed on the substrate for display.

10. The method of claim 9, wherein the backlight comprises a plurality of individual light sources.

11. The method of claim 9, wherein the backlight comprises a single light source.

12. The method of claim 8, further comprising:
emitting light from the backlight through a plurality of apertures;
measuring the characteristics of the light emitted through each aperture;
determining light calibration data for each aperture; and
determining the color calibration data based on the determined light calibration data.

13. The method of claim 12, further comprising measuring the characteristics of the light emitted through each aperture by controlling a movable color sensor to measure the characteristics of the light emitted through each aperture.

14. The method of claim 12, further comprising measuring generating the color calibration data, by:
   printing a plurality of color patches aligned with the apertures;
   measuring the characteristics of the light emitted through the apertures and through the color patches;
   applying the determined light calibration data for the apertures to the measured characteristics of the light emitted through the apertures and through the color patches, to determine calibrated color patch light characteristic data; and
   determine the color calibration data, based on the determined calibrated color patch light characteristic data.

15. A non-transitory computer-readable data storage medium storing instructions executable by a printing system to:
   receiving print data of an image that is to be backlight when the image is displayed;
   receiving color calibration data that accounts for characteristics of a backlight; and
   generating calibrated print data from the print data of the image, based on the color calibration data; and
   causing a printing engine to print the image on a substrate by printing the calibrated print data.

16. The non-transitory computer-readable data storage medium of claim 15, wherein the instructions are executable by the printing system to further:
   backlight, using the backlight, the image as printed on the substrate for display.

17. The non-transitory computer-readable data storage medium of claim 16, wherein the backlight comprises one of: a plurality of individual light sources, and a single light source.

18. The non-transitory computer-readable data storage medium of claim 15, wherein the instructions are executable by the printing system to further:
   emit light from the backlight through a plurality of apertures;
   measure the characteristics of the light emitted through each aperture;
   determine light calibration data for each aperture; and
   determine the color calibration data based on the determined light calibration data.

19. The non-transitory computer-readable data storage medium of claim 18, wherein the instructions are executable by the printing system to further measure the characteristics of the light emitted through each aperture by controlling a movable color sensor to measure the characteristics of the light emitted through each aperture.

20. The non-transitory computer-readable data storage medium of claim 18, wherein the instructions are executable by the printing system to further generate the color calibration data, by:
   printing a plurality of color patches aligned with the apertures;
   measuring the characteristics of the light emitted through the apertures and through the color patches;
   applying the determined light calibration data for the apertures to the measured characteristics of the light emitted through the apertures and through the color patches, to determine calibrated color patch light characteristic data; and
   determine the color calibration data, based on the determined calibrated color patch light characteristic data.

* * * * *